US 6,666,464 B1

(12) United States Patent  (10) Patent No.: US 6,666,464 B1
Mabry et al.  (45) Date of Patent: Dec. 23, 2003

(54) CONTAINMENT CART FOR SOLVENT RECOVERY SYSTEM

(75) Inventors: Michael D. Mabry, Marietta, GA (US); Donald R. McAllister, Waleska, GA (US)

(73) Assignee: IHS Solvent Solutions, Inc., Canton, GA (US)

(*) Notice: Subject to any disclaimer, the term of this patent is extended or adjusted under 35 U.S.C. 154(b) by 0 days.

(21) Appl. No.: 09/544,885

(22) Filed: Apr. 7, 2000

Related U.S. Application Data

(60) Provisional application No. 60/128,798, filed on Apr. 12, 1999.

(51) Int. Cl.[7] .............................................. B62D 21/14
(52) U.S. Cl. .................................. 280/43.17; 280/43.24
(58) Field of Search ............................. 280/43.17, 43, 280/43.24, 47.26, 47.34; 14/72.5, 71.1

(56) References Cited

U.S. PATENT DOCUMENTS

| 3,837,120 A | * | 9/1974 | Hanks et al. ............... 49/489.1 |
| 4,295,431 A | * | 10/1981 | Stavlo ....................... 108/55.1 |
| 4,319,762 A | * | 3/1982 | Streit et al. ................ 280/79.2 |
| 4,465,413 A | * | 8/1984 | Petren ....................... 280/43.24 |
| 5,029,602 A | * | 7/1991 | McKinney et al. ......... 137/209 |
| 5,259,215 A | * | 11/1993 | Rocca ....................... 280/47.26 |
| 5,570,895 A | * | 11/1996 | McCue et al. ............ 280/47.26 |
| 5,752,543 A | * | 5/1998 | Groening ................... 280/79.5 |
| 5,797,612 A | * | 8/1998 | Buccioni .................. 280/47.26 |
| 5,813,680 A | * | 9/1998 | Shaw et al. .............. 280/47.26 |
| 6,029,718 A | * | 2/2000 | Jackson et al. .......... 280/47.34 |

* cited by examiner

Primary Examiner—Robert P. Olszewski
Assistant Examiner—Elaine Gort
(74) Attorney, Agent, or Firm—Kilpatrick Stockton LLP

(57) ABSTRACT

The containment cart has a floor, two side walls, and a rear wall between the side walls. Wheels are mounted to the floor, allowing the containment cart to be readily transportable and insertable into a drum cavity of a solvent recovery device. Caster wheels assist an operator in changing direction of the cart. A releasable and sealable door acts as a ramp once lowered. Further, while lowered, the door raises the front wheels to prevent the cart from undesired movement while drums are being placed on or removed from the cart. A channel is disposed along a front face of the side walls and floor of the cart to receive a gasket. The door has a mating protrusion extending outwardly from the door to extend into the channel and sealably engage the gasket while the door operably engages the front face.

12 Claims, 5 Drawing Sheets

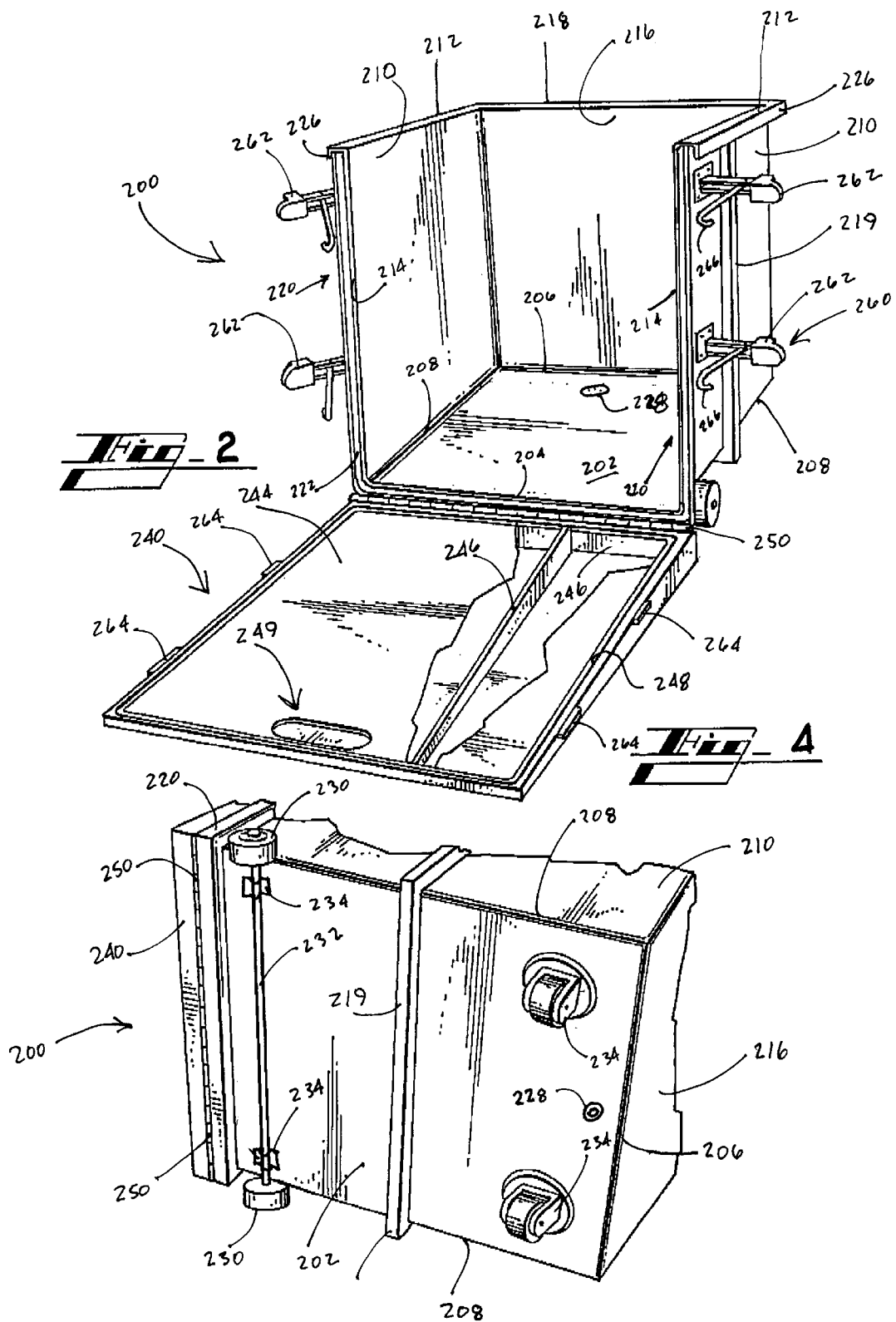

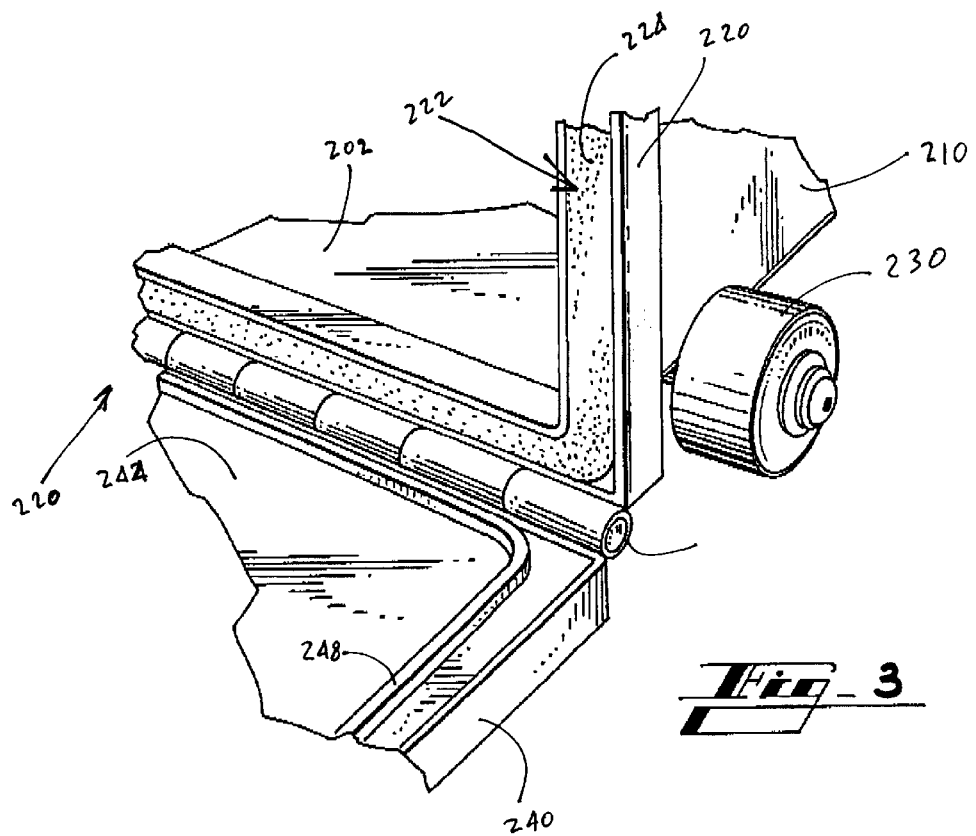
Fig_3
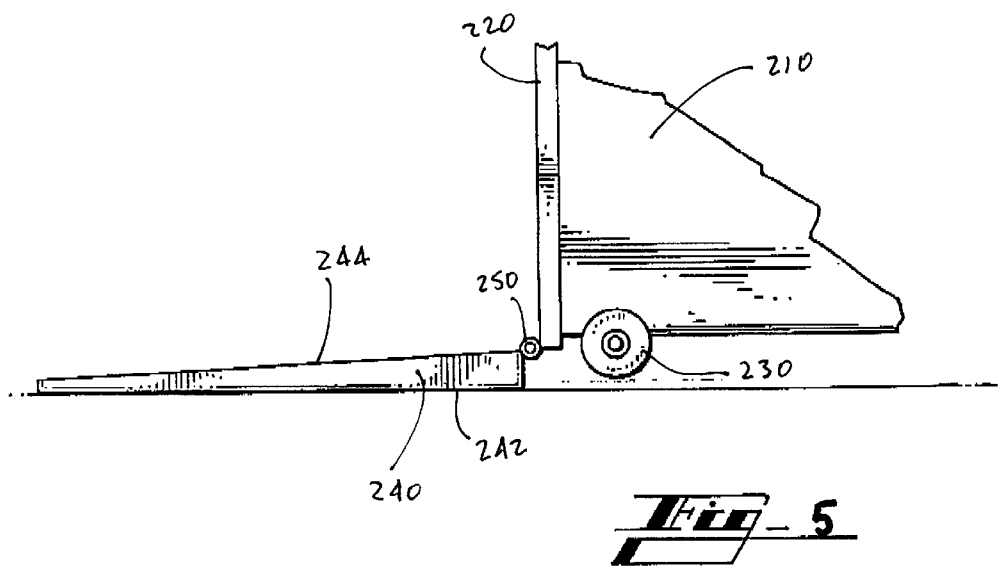
Fig_5

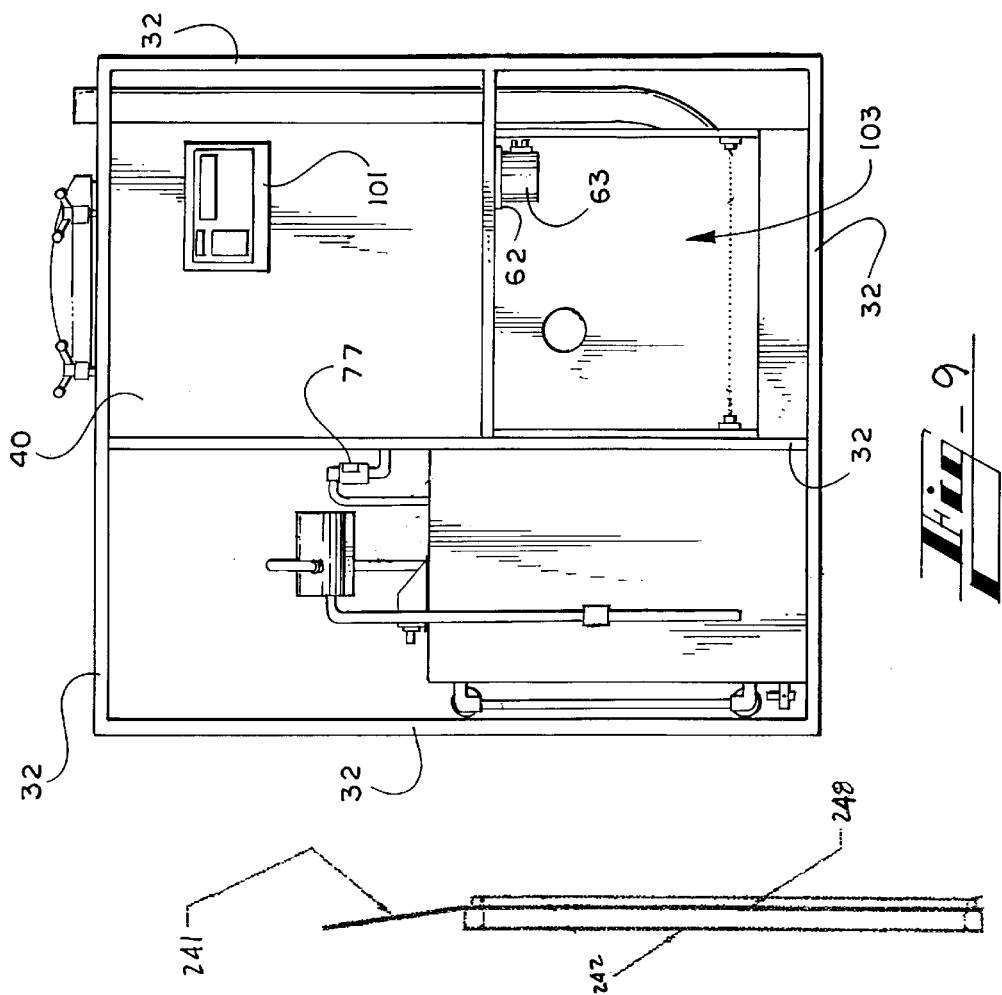
FIG-9
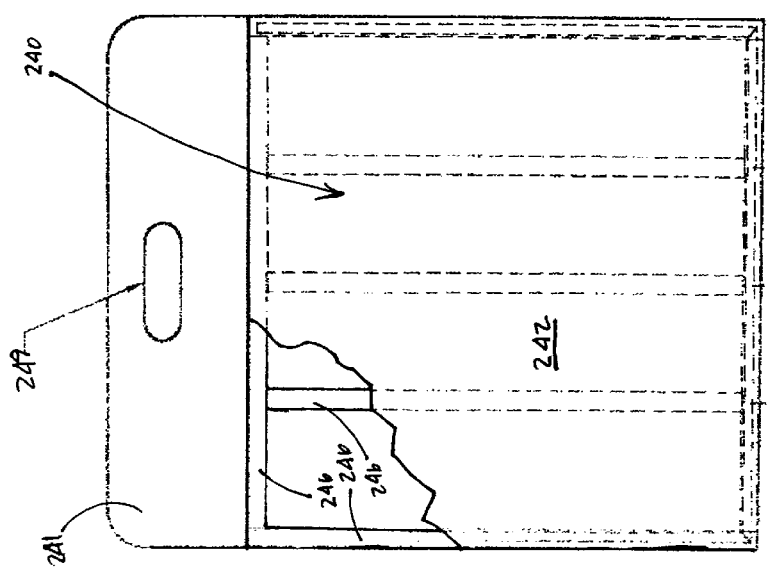
FIG-7
FIG-6

CONTAINMENT CART FOR SOLVENT RECOVERY SYSTEM

This application claims benefit of U.S. Provisional Patent Application No. 60/128,798 filed, Apr. 12, 1999, which is incorporated herein by reference.

FIELD OF THE INVENTION

The present invention relates generally to the field of liquid containment devices. More particularly, the present invention relates to a device for containing residue drained from a still utilized in photopolymer solvent recovery operations.

BACKGROUND OF THE INVENTION

It is known in the prior art to produce printing plates from acrylic elastomer resins and synthetic rubbers utilizing photoengraving and chemical milling techniques. Generally, a layer of such resins or rubbers are placed onto a surface of a flexible plate and then exposed to light through a photographic film or stencil having a desired pattern to be formed onto the printing plate. Exposure of the resins and rubbers to light cures the resins and rubbers, altering the susceptibility of the resins and rubbers to removal by a photopolymer solvent. By applying the photopolymer solvent to the light exposed layer of resins or rubbers on the printing plate, the uncured photopolymer resin or rubber is chemically etched away by the photopolymer solvent in a pattern reverse to that of the film or stencil. The resin or rubber etched from the plate is removed with the waste photopolymer fluid.

Typically, the solvents utilized for the photopolymer solvent are relatively costly and generally have flash point temperatures above 140° F. Further, disposal of the waste photopolymer fluid is likewise relatively expensive and presents environmental problems and concerns. Therefore, to more efficiently produce the aforementioned printing plates, devices were developed to recover the photopolymer solvent from the waste photopolymer fluid.

Prior art photopolymer solvent recovery devices utilize vacuum assisted distillation to separate the photopolymer solvent from the photopolymer resins or rubbers. Upon separation and removal of the photopolymer solvent, the residue resins or rubbers remain in the device as a concentrated residue. Typically, the residue is removed from the device by gravity flow through a drain typically into a disposal drum. To maintain fluidity of the concentrated residue, a certain amount of photopolymer solvent typically remains in the residue, otherwise the resins or rubbers will coalesce into an amorphous solid within the device. Unfortunately, it is known that on occasions the drain has been improperly opened to permit the residue to uncontainably flow out of the still. This is undesirable because it is both time-consuming and costly to remove the spill and exposes an operator to the chemicals comprising the waste photopolymer fluid. Further, it has been discovered that the concentrated residue has a flash point temperature between 100° F. and 140° F., defining the residue as Class 11 liquid in accordance with 29 CFR 1910.106(a)(18)(i). Not only is the residue a potential fire hazard, particularly as the residue is drained from the device at an elevated temperature, its disposal is subject to special handling requirements.

In the photopolymer solvent recovery industry, recent innovations have been primarily directed to maintaining residue fluidity while attempting to maximize solvent recovery. However, very little attention has been given to the prevention of residue spills.

In our pending U.S. patent application Ser. No. 09/151,222 filed Sep. 10, 1998, entitled Modular Solvent Recovery Device, a modular solvent recovery device has a still and a drum cavity positioned thereunder which is sized to receive a drum. Concentrated residue discharged from the still flows into the drum for appropriate handling and disposal. The drum cavity has a floor with two side walls and a back wall extending upwardly therefrom. Pivotally mounted to a frame is a cavity door which removably engages the floor and the side walls. A gasket is removably mounted to the cavity door to assist in creating a seal between the cavity door and the floor and side walls. The cavity door has sufficient height to contain and hold the contents of the still in the event of an undesired spill. However, the drum must be manually inserted and removed from the drum cavity. When the drum is filled with residue, it is difficult to move due to its weight and the confined space of the drum cavity. Further, there is risk of a spill during the removal operation because it is difficult to place a lid onto the drum while in the drum cavity. Although other known solvent distillation devices have a drum opening, such openings simply permit the disposition of the drum in a position to receive waste discharged from the device and lack the containment capability of the drum cavity described above. Spills occurring in the opening can flow out of the device, requiring expensive and hazardous cleanup operations.

Thus, there remains a need for a containment cart which can receive and hold the contents of the still in the event the drain is improperly opened and which assists in the insertion and removal of the drum into and from, respectfully, the drum cavity or opening. Accordingly, it is to the provision of a containment cart for a solvent recovery system that meets these needs that the present invention is primarily directed.

SUMMARY OF THE INVENTION

This invention overcomes the disadvantages of the prior art by providing a containment cart utilized to contain liquid spills within or from a solvent recovery device. The containment cart has a floor, two side walls, and a rear wall between the side walls. Wheels are mounted to the floor, allowing the containment cart to be readily transportable and insertable into a drum cavity of a solvent recovery device. Caster wheels assist an operator in changing direction of the cart. A releasable and sealable door acts as a ramp once lowered. Further, while lowered, the door raises the front wheels to prevent the cart from undesired movement while drums are being placed on or removed from the cart. A channel is disposed along a front face of the side walls and floor of the cart to receive a gasket. The door has a mating protrusion extending outwardly from the door to extend into the channel and sealably engage the gasket while the door operably engages the front face.

Thus, a unique containment cart for a solvent recovery system is now provided that successfully addresses the shortcomings of existing solvent recovery systems and provides distinct advantages over such solvent recovery systems. Additional objects, features, and advantages of the invention will become more apparent upon review of the detailed description set forth below when taken in conjunction with the accompanying drawing figures, which are briefly described as follows.

BRIEF DESCRIPTION OF THE DRAWINGS

FIG. 2 is a front perspective view of the containment cart with a door open.

FIG. 3 is a partial perspective view of a channel at the intersection of a side wall and a floor of the containment cart.

FIG. 4 is a bottom perspective view of the containment cart.

FIG. 5 is a side elevation view of the containment cart.

FIG. 6 is a front elevation view of an embodiment of a door of the containment cart.

FIG. 7 is a side elevation view of the door of FIG. 6.

FIG. 9 is a side elevation view of the device of FIG. 8 illustrating a drum cavity.

DESCRIPTION OF THE PREFERRED EMBODIMENTS

Figure 1:
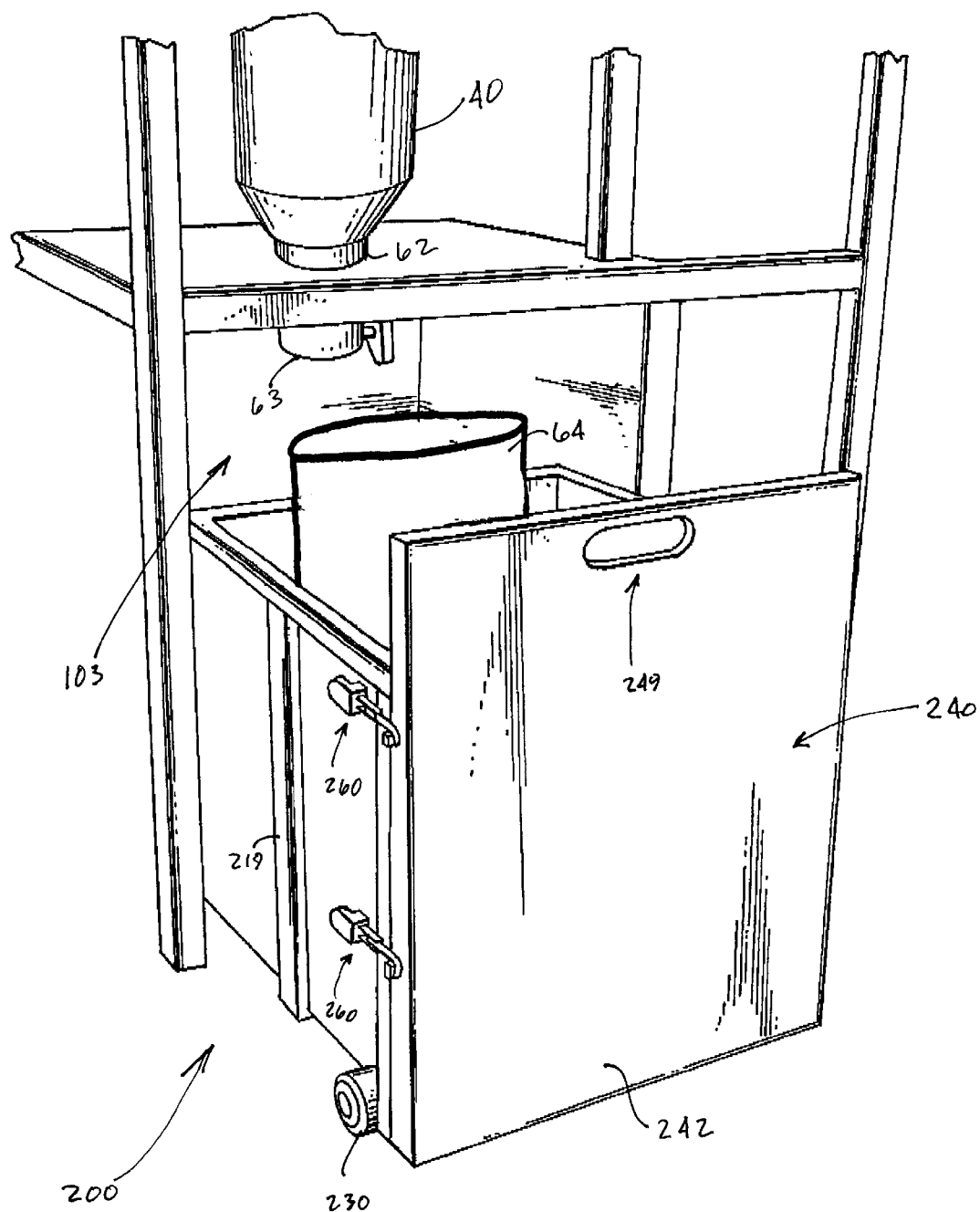
FIG. 1 is a partial front perspective view of a containment cart made in accordance with the present invention partially disposed in a drum cavity of a solvent recovery device.

For a more complete understanding of the present invention, reference should be made to the following detailed description taken in connection with the accompanying drawings, wherein like reference numerals designate corresponding parts throughout the several figures. Referring first to FIG. 1, a mobile containment cart 200 made in accordance with the present invention is partially disposed within a drum cavity 103 vertically below a still 40 of a solvent recovery device 30. A residue container 64 is positioned within the cart 200, and upon insertion of the cart 200 into the drum cavity 103, the residue container 64 is in a position to receive material released from the still 40.

Referring additionally to FIGS. 2 and 3, the cart 200 has a floor 202 having a front edge 204, a rear edge 206, and two side edges 208. Two side walls 210 respectively extend upwardly from the floor 202 along the side edges 208 and terminate at top edges 212. Each side wall has a front edge 214. A rear wall 216 extends from the floor along the rear edge 206 in sealable engagement with the side walls 210 and terminates at top edge 218. Preferably, top edges 212 and 218 form a plane which is substantially parallel to the floor 202. Front edges 204 and 214 of the floor 202 and side walls 210, respectively, define a front face 220. A channel 222 is disposed proximate the front face of the side walls 204 and 206 and the floor 202 of the cart 200 to receive a gasket 224. The channel 222 can be formed by attaching an L-shaped angle member to the floor 202 and side walls 210 along front edges 204 and 214. A lip 226 extends along top edges 212 and 218 to assist the operator in moving the cart 200. To provide controllable drainage from the cart 200 in the event of a spill, a closable drain 228 is disposed through the floor 202. A reinforcing band 219, which provides structural support, is mounted to and extends from the top edge 212 of one side wall 210 across the floor 202 to the top edge 212 of the other side wall 210.

The gasket 62 comprises a braid of fibers or strands made from tetrafluoroethylene fluorocarbon polymers, fluorinated ethylene-propylene resin, or a mixture thereof. The gasket 62 should be made from a material which is inert to and non-soluble in the materials being processed in solvent recovery device 30, particularly at temperatures elevated above ambient. Preferably, the gasket is made of tetrafluoroethylene fluorocarbon polymers, fluorinated ethylene-propylene resin, or a mixture thereof, which are marketed under the tradename TEFLON. More preferred, the gasket 62 comprises a braid of fibers or strands made from tetrafluoroethylene fluorocarbon polymers, fluorinated ethylene-propylene resin, or a mixture thereof.

Referring to FIGS. 4 and 5, disposed beneath the floor 202 are front wheels 230 and caster wheels 234, making the cart 200 readily mobile, transportable, and insertable into the drum cavity 103 of the solvent recovery device 30. The front wheels 230 are mounted to an axle 232, which is rotatably disposed through brackets 233 attached to the floor 202. The caster wheels 234 preferably pivot 360° about an axis to assist the operator in changing direction of the cart 200.

With continued reference to FIG. 4 and additionally to FIGS. 3 and 5–7, a releasable and sealable door 240 is pivotally mounted to the floor 202 by hinge 250 and acts as a ramp once lowered. The door 240 has a front wall 242, a back wall 244 and reinforcing panels 246 disposed between the front and back walls 242 and 244. As illustrated in FIG. 5, the door 240 is pivotally mounted to the floor 202 in a position such that while the door 240 lowered, the front wheels 230 are raised vertically above the ground or supporting surface to prevent the cart 200 from undesired movement while residue containers are being placed on or removed from the cart 200. The door 240 has a protrusion 248 extending outwardly from the door 240 to matingly extend into the channel 222, engage the gasket 224, and form a protrusion/gasket seal upon operably engaging the door 240 with the front face 220. A handle 249 is provided in the door 240 to assist the operator in raising and lowering the door 240. In one embodiment of the door 240, illustrated in FIGS. 2 and 5, the door 240 is tapered, that is, the distance between the front and back walls 242 and 244 narrows as the door 240 extends away from the floor 202. In the embodiment illustrated in FIGS. 3, 6, and 7, the door 240 has a substantially rectangularly-shaped cross-section. In this embodiment, a ramp 241 is formed at the distal end of the door 240 which is bent with respect to the back wall 244 preferably to a position in which the ramp 241 engages the ground while the door 240 is lowered. The ramp 241 provides for easy ingress and egress of the residue container 64.

As shown in FIGS. 1 and 2, clamp assemblies 260 are utilized to secure the door 240 to the front face 220. The clamp assembly 260 comprises a lockable J-clamp 262 which is mounted to a side wall 210 proximate the front face 220 and a post 264 mounted to the door 240. Such J-clamps, generally referred to as latch action clamps, have adjustable hooks 266 and are manufactured by DE-STA-CO Industries, Birmingham, Mich., (model numbers 330,351,371, and 381). The J-clamps 262, which can have lockable levers, removably engage respective posts 264 to draw the protrusion 248 into sealable engagement with the gasket 224. Upon releasing the respective levers, the J-clamps 262 can be disengaged from the respective posts 264 to release the door 240.

Figure 8:
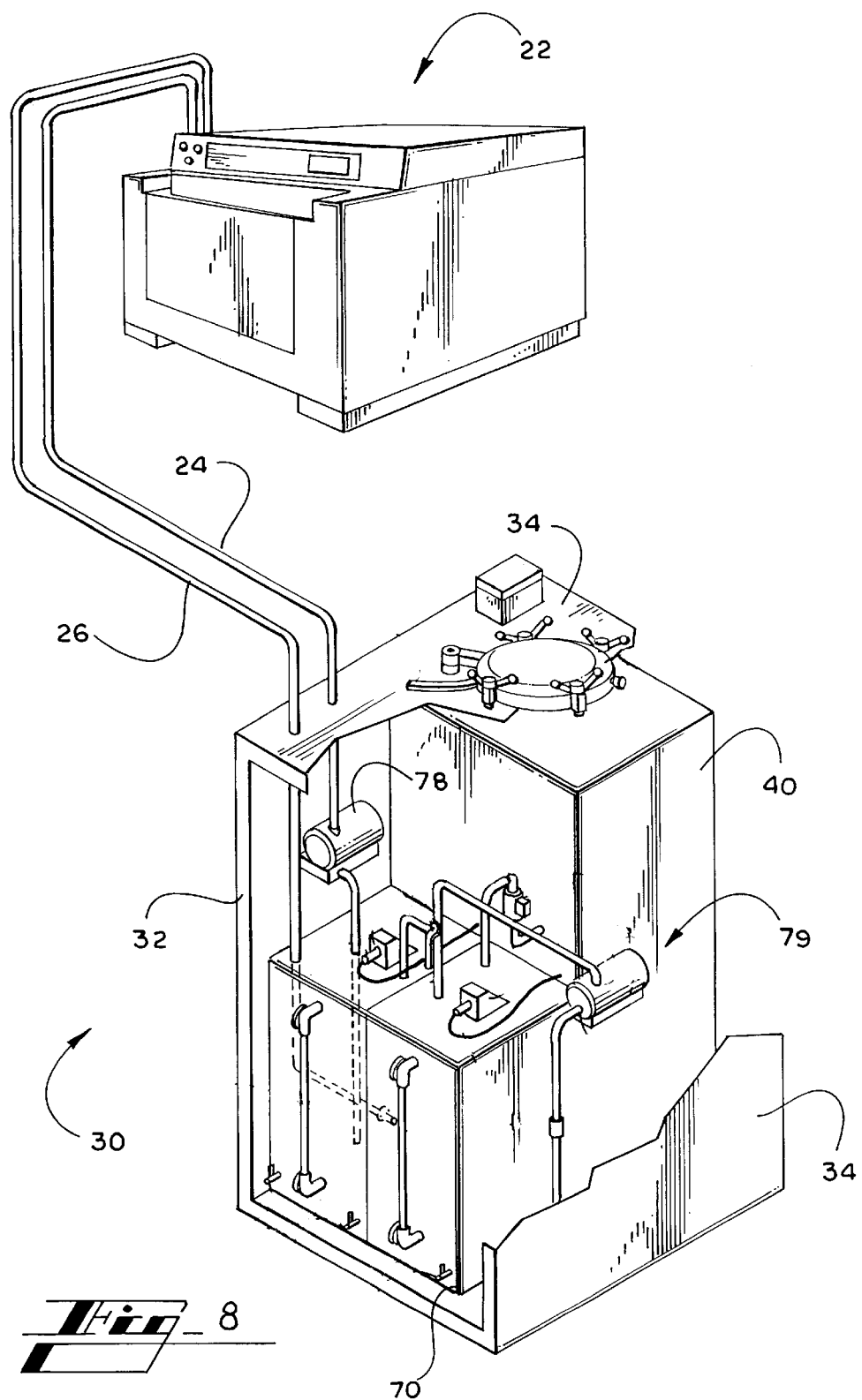
FIG. 8 is a perspective view of a solvent recovery device in fluid communication with a plate processor.

Referring now to FIGS. 8 and 9, a modular solvent recovery device 30 operably connected in fluid communication with a conventional plate processor 22. The various component parts of the device 30 are mounted onto a frame 32 and enclosed within an enclosure 34 mounted to the frame 32. Enclosure doors (not shown) are strategically placed on the enclosure 34 to permit access therein to the component parts. The component parts of the device 30 are connected in operative fluid communication with the plate processor 22 through a solvent feed conduit 24 and a waste photopolymer fluid conduit 26. The solvent feed conduit 24 transports solvent from the device 30 to the plate processor 22, and the waste photopolymer fluid conduit 26 transports waste photopolymer fluid generated during plate making operations of the plate processor 22 to the device 30.

Solvents are employed in the plate processor 22 to dissolve portions of a synthetic polymeric resin plate exposed to light in a photopolymer plate making process. The plate making process that takes place in the plate processor 22 is conventional, is not a part of the present invention, and therefore is not described in detail. The waste photopolymer fluid received by the device 30 of the invention from the plate processor contains a mixture of the selected solvent and photopolymer solids consisting of acrylic elastomer resins and synthetic rubber. The photopolymer solids are soluble in the selected solvent.

With continued reference to FIGS. 8 and 9, the general arrangement of the device 30 is shown. The device 30 comprises a still 40, a heating assembly (not shown), a tank 70, a solvent delivery pump 78, a tank pump assembly 79, a condenser (not shown), a vacuum pump (not shown), a programmable controller 101, a switch cabinet (not shown), and a drum cavity 103. A detailed discussion of the device 30 is provided in U.S. patent application Ser. No. 09/151,222, incorporated herein by reference in its entirety.

The still 40 comprises a sealable vessel which is tapered toward a dump opening 62 at the center of the still 40 bottom. Mounted to the still 40 at the dump opening 62 is an actuatable dump valve 63 to control the release of any contents of the still 40. The dump valve 63 communicates with a residue container 64 positioned below the still 40. By supporting the still 40 above the residue container 64, residue can be drained from the still 40 to the residue container 64 solely by gravity. Stills 40 of various capacities may be utilized depending upon the needs of the operator and the amount of waste photopolymer fluid being produced by the plate processor 22.

The heating assembly heats the still 40 and the contents therein by to the waste photopolymer fluid boiling point to distill the solvent from the waste photopolymer fluid. As the still 40 distills the waste photopolymer fluid, solvent is removed from the still 40 and the waste photopolymer fluid is reduced to the concentrated residue. The desired solvent to be distilled may be any number of commercially available solvent blends, including the widely used prior art solvent blend of alcohol-perchloroethylene. Examples of some commercial solvents typically employed in plate making operations by plate processors 22 to dissolve portions of the photopolymer coated plate include solvents marketed under the trade names OPTISOL, distributed by DuPont Company; SOLVIT, distributed by Polyfibron Technologies, Inc.; and NUTRE CLEAN, distributed by NuPro Technologies. The gasket 224 should be inert and non-solute with respect to the photopolymer solvent. Although it is desirable to maximize solvent recovery from the waste photopolymer fluid, a portion of the solvent remains as a component of the concentrated residue. Due to the distillation operation, the mixture of the solvent, generally a Class III liquid, and the photopolymer remaining within the concentrated residue undergo chemical change, resulting in the concentrated residue having a flash point temperature between 100 and 140° F. Thus, the concentrated residue is a Class II residue in accordance with 29 CFR 1910.106(a)(18)(i).

Referring to FIGS. 1 and 9, a drum cavity 103 is disposed below the still 40 to receive the residue container 64. Sensors (not shown) may be positioned within the drum cavity 103 to detect the presence of the residue container 64 and the level or amount of concentrated residue therein. By placing the residue container 64 within the drum cavity 103, the residue container 64 is detected by the sensors, permitting the dump valve 63 to open when appropriate during the distillation operation and drain the contents of the still 40. While residue container 64 is absent from the drum cavity 103, the sensors operably prevent the dump valve 63 from actuating open.

As the solvent is distilled from the waste photopolymer fluid, the material contained in the still 40 becomes more concentrated and coalesces toward a soft, plastic, amorphous solid to form a concentrated residue. Upon completion of the distillation process, the actuatable dump valve 63 opens, permitting the concentrated residue to drain from the still interior 41 into the residue container 64 disposed within the drum cavity 103.

When the residue container 64 is filled with concentrated residue, the sensors operably prevent the dump valve 63 from opening until an operator empties or replaces the filled residue container 64. However, faulty signals can be sent to the dump valve 63 causing it to improperly and untimely actuate open during distillation operations. As a result, the fluid contents of the still 40 uncontrollably drain therefrom. If the residue container 64 is absent or has insufficient capacity to receive the still 40 contents, a spill occurs within the drum cavity 103. Even if the drum cavity 103 is capable of containing the spill, cleanup is problematic due to the confined space and the hazardous nature of the photopolymer solvent. Further, if the spill discharges from the solvent recovery device 30, cleanup is even more problematic due to various state and/or national regulatory requirements. By placing the residue container 64 into the containment cart 200, any overflow from the residue container 64 or untimely discharge from the still 40 while the containment cart is within the drum cavity 103 are contained within the containment cart 200 for easy disposal and cleanup. In the preferred embodiment, the containment cart 200 has a capacity substantially equal to the capacity of the still 40.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. Further, the various components of the embodiments of the invention may be interchanged to produce further embodiments and are these further embodiments are intended to be encompassed by the present invention.

Therefore, the foregoing is considered as illustrative only of the principles of the invention. Further, various modifications may be made of the invention without departing from the scope thereof and it is desired, therefore, that only such limitations shall be placed thereon as are imposed by the prior art and which are set forth in the appended claims.

What is claimed is:

1. A containment cart, comprising:

a floor;

two side walls extending upwardly from the floor;

a rear wall extending upwardly from the floor and sealably engaging the side walls, the floor and side walls having a front face;

a channel disposed proximate the front face for receiving a gasket;

a door pivotally mounted to the floor and having a protrusion positioned to be insertable into the channel to engage the gasket;

at least one clamp assembly to releasably seal the door with the front face; and a plurality of wheels operably mounted to the floor, the wheels including at least one front wheel and the door being pivotally mounted to the floor in a position and having a size sufficient to raise the at least one front wheel vertically from a supporting surface, whereby the cart is secured from movement.

2. The cart as claimed in claim 1, wherein the door has a ramp.

3. The cart as claimed in claim 1, wherein the door is tapered.

4. The cart as claimed in claim 1, further comprising a closable drain through the floor.

5. A containment cart comprising:

a floor;

two side walls extending upwardly from the floor, a rear wall extending upwardly from the floor between and sealably engaging the side walls;

a door pivotally mounted to the floor;

channel means for receiving and positioning a gasket proximate a front face of the two side walls and the floor;

protrusion means for engaging the gasket upon positioning the door proximate the front face;

at least one clamp to releasably engage the door with the front face; and a plurality of wheels operably mounted to the floor, the wheels including at least one front wheel and the door being pivotally mounted to the floor in a position and having a size sufficient to raise the at least one front wheel vertically from a supporting surface, whereby the cart is secured from movement.

6. The cart as claimed in claim 5, wherein the door has a ramp.

7. The cart as claimed in claim 5, wherein the door is tapered.

8. The cart as claimed in claim 5, further comprising a closable drain through the floor.

9. A containment cart for a modular solvent recovery device having a still of a predetermined capacity, comprising:

a floor having a front edge;

two side walls extending upwardly from the floor and having respective front edges;

a front face defined by the front edges of the side walls and the floor;

a rear wall extending upwardly from the floor between and engaging the side walls;

a channel disposed along the front face;

a door pivotally mounted to the floor proximate the front face operably sealably engaging the channel, the floor, side walls, rear wall, and door define a containment volume which is at least equal to the still capacity;

at least one clamp releasably securing the door to the front face; and a plurality of wheels operably mounted to the floor, the wheels including at least one front wheel and the door being pivotally mounted to the floor in a position and having a size sufficient to raise the at least one front wheel vertically from a supporting surface, whereby the cart is secured from movement.

10. The cart as claimed in claim 9, wherein the door has a ramp.

11. The cart as claimed in claim 9, wherein the door is tapered.

12. The cart as claimed in claim 9, further comprising a closable drain through the floor.

* * * * *